United States Patent Office 3,532,768
Patented Oct. 6, 1970

3,532,768
HEAT-HARDENABLE BINDERS FOR COATING COMPOSITIONS
Horst Dalibor and Hans-Joachim Kiessling, Hamburg, Germany, assignors to Reichhold Chemicals, Inc., White Plains, N.Y.
No Drawing. Filed Mar. 10, 1967, Ser. No. 622,112
Claims priority, application Germany, Mar. 28, 1966, R 42,946
Int. Cl. C08f 37/16; C08g 37/32
U.S. Cl. 260—854                                     10 Claims

ABSTRACT OF THE DISCLOSURE

The present invention relates to heat-hardenable binders consisting of mixtures that contain (a) 50 to 95% by weight of soluble reaction products of anhydride groups-containing copolymers reacted with polyols and (b) 5 to 50% by weight of etherified aminotriazine-formaldehyde resins, preferably melamine-formaldehyde resins. For the preparation of the component (a) it is possible to use copolymers that were obtained by solution polymerization of monomer mixtures consisting of an effective quantity, preferably at least 1% but less than 20 mole percent and in any event not more than 25% by weight of and $\alpha,\beta$-unsaturated dicarboxylic acid anhydride and normal or branched $\alpha$-olefines having 1 to 20 carbon atoms as well as acrylic acid alkyl esters and/or fumaric acid dialkyl esters and, if necessary, methacrylic acid methyl esters, which are reacted with polyols, preferably with triols. The component (a) obtained by this reaction should have acid numbers of 5 to 60, preferably of 20 to 50, and hydroxyl numbers of 20 to 120, preferably of 30 to 90. As the component (b) it is possible to use conventional etherified aminotriazine-formaldehyde resins, preferably melamine-formaldehyde resins.

RELATED APPLICATIONS

The present application is related to the following: (1) U.S. application Ser. No. 622,080, filed Mar. 10, 1967, corresponding to German application R 42,944, filed Mar. 28, 1966, (2043); (2) U.S. application Ser. No. 622,039, filed Mar. 10, 1967, corresponding to German application R 42,945, filed Mar. 28, 1966 (2054); (3) U.S. application Ser. No. 622,090, filed Mar. 10, 1967, now Pat. No. 3,474,076 granted Oct. 21, 1969, corresponding to German application R 42,947 (2056), filed Mar. 28, 1966, and (4) U.S. application Ser. No. 622,041, filed Mar. 10, 1967, corresponding to German application R 42,948, filed Mar. 28, 1966 (2057).

The present invention relates to heat-hardenable binders consisting of mixtures that contain (a) 50 to 95% by weight of soluble reaction products of anhydride groups-containing copolymers reacted with polyols and (b) 5 to 50% by weight of etherified aminotriazine-formaldehyde resins, preferably melamine-formaldehyde resins. For the preparation of the component (a) it is possible to use copolymers that were obtained by solution polymerization of monomer mixtures consisting of an effective quantity, preferably at least 1% but less than 20 mole percent and in any event not more than 25% by weigth of an alpha-beta unsaturated dicarboxylic acid anhydride and normal or branched alpha-olefins having 1 to 20 carbon atoms as well as acrylic acid alkyl esters and/or fumaric acid dialkyl esters and, if necessary, methacrylic acid methyl esters, which are reacted with polyols, preferably with triols. The component (a) obtained by this reaction should have acid numbers of 5 to 60, preferably of 20 to 50, and hydroxyl numbers of 20 to 120, preferably of 30 to 90. As the component (b) it is possible to use conventional etherified aminotriazine-formaldehyde resins, preferably melamine-formaldehyde resins.

Heat-hardenable binders for coating compositions consisting of aminotriazine resins and plasticizing components having hydroxyl and carboxyl groups are known. As the plasticizing component it was customary to use therewith condensation resins of low molecular weight or high molecular weight polymers having thermoplastic properties.

German Pat. 544,326 describes the preparation of anhydride groups-containing polymers that are reacted with mono- and polyols. However, soluble anhydride groups-containing polymers reacted with mono- or dialcohols are unimportant as binders for coating compositions, particularly for lacquer raw materials, since even combinations thereof with urea- or aminotriazine-formaldehyde resins resulted in coatings having insufficient resistance to solvents, water and bases. Soluble anhydride groups-containing copolymers of the kind reacted only with triols could not, however, be obtained by the process of German Pat. 544,326.

Copolymers, as described in the examples of the aforesaid German patent, having a content of 30 and more percent by weight of maleic acid anhydride in the copolymer, yield insoluble products upon being reacted solely with trivalent alcohols, before achieving compatibility with urea- or aminotriazine-formaldehyde resins.

It has now been found that it is possible to obtain products that are suitable for coating compositions if the component (a), i.e., the copolymers reacted with polyols, used in combination with aminotriazine-formaldehyde resins are copolymers containing less than 20 mole percent by weight $\alpha,\beta$-unsaturated dicarboxylic acid anhydride. For the reaction with the copolymers it is possible to use as polyols tri- to hexavalent alcohols, if necessary, together with mono- and dialcohols. Moreover, it was found that products particularly suitable for use in combination with etherified aminotriazine-formaldehyde resins as binders for coating compositions, are those wherein the copolymers are reacted with trivalent alcohols, without the use of mono- and divalent alcohols. Outstanding properties were found in the case of copolymers reacted with polyols wherein the polyols are trivalent alcohols and, more particularly, those that are less polar than glycerin, as for example, trimethylol alkanes or hexanetriol. Of these trivalent alcohols that are less polar than glycerin, the most suitable for use in the mixture of the present invention was found to be a reaction product with trimethylolpropane and, more particularly, one wherein for each mole of anhydride in the copolymer there are used 0.8 to 1.8 mole, preferably 0.8 to 1.2 mole of trimethylolpropane.

By the partial reaction of the copolymers having a content of at least 1% but less than 20 percent, preferably of 5 to 10 percent by weight of an $\alpha,\beta$-unsaturated dicarboxylic acid anhydride, with polyols of the aforesaid type it is possible to obtain, for use as component (a), soluble reaction products which, aside from an acid number of 5 to 60, preferably of 20 to 50, possess an hydroxyl number of 20 to 120, preferably of 30 to 90.

For the coating compositions according to the present invention, the content of component (a) in the form of modified copolymers having free hydroxyl groups, is a prerequisite for the combination and compatibility with aminotriozine-formaldehyde resins and for the cross-linking reactions with the methylol- or methylolether groups which are promoted by the free carboxy groups.

In the preparation of component (a), the copolymer being reacted may contain instead of copolymerized maleic acid anhydride other α,β-unsaturated dicarboxylic acid anhydrides, such as itaconic acid anhydride.

For the use as binders in coating formulations in accordance with the present invention, the structure as well as the composition of the starting polymers for the preparation of component (a), is of considerable importance. Aside from α,β-unsaturated dicarboxylic acid anhydrides, the following monomers can be used: ethylene, propylene, and α-olefins of the formula $H_2C=CH_3$, wherein R represents a straight-chain or branched alkyl radical having 2 to 20 carbon atoms, acrylic acid esters, and fumaric acid esters, each having 1 to 10 carbon atoms in the alcohol component thereof, and methylmethacrylate. The selection of the comonomer mixture depends upon the particular use contemplated for component (a) in the form of the modified copolymer as binders for coating compositions and based upon the nature of the rigid or flexible surfaces to be coated, must generally conform to the desired properties such as hardness and elasticity. α-olefines, such as ethylene, propylene, butylene, pentylene and hexylene, to the same degree as methylmethacrylate are capable of imparting hardness properties to the copolymers and thus to the component (a). Acrylic acid esters having two or more carbon atoms in the alcohol portion thereof, methacrylic and fumaric acid esters with four and more carbon atoms in the alcohol portion thereof, when used as comonomers, generally produce softness and flexibility in the copolymer if the alcohol portion in these monomers is not branched.

Also α-olefines having six and more carbon atoms in chains that are not branched, when used as comonomers, impart elastomeric properties to the copolymer.

For use as comonomers it was found that, for example, acrylic acid esters having two or more carbon atoms in the alcohol portion and fumaric acid esters with four and more carbon atoms in the alcohol portion thereof impart softness and flexibility to the copolymer if the alcohol portion in these ester monomers is not branched. The softness of the α-olefine copolymers is, if necessary, counteracted by using methyl-methacrylate therewith as comonomer.

The copolymers serving as a basis for component (a) are prepared in known manner at raised temperatures, preferably in aromatic solvents, for example, in xylene or high-boiling mixture of aromatics. The reaction takes place in a temperature range between 50 and 250° C., preferably from 90 to 170° C., by a free radical-polymerization process. This process is carried out in the presence of catalysts yielding free radicals such as peroxides, as for example, benzoyl peroxide, di-tert.-butylperoxide or azo compounds. However, the reaction can also be carried out thermally at higher temperatures. When using low-boiling monomers, or monomers that are gaseous at room temperature, it is necessary to operate under pressure. In carrying out the process according to the present invention, it is generally preferred to effect the reaction with the polyols in a solvent that is the same as the solvent used for the polymerization of the monomers. In addition to the preferred aromatic solvent used, it is possible to operate in the presence of other solvents which do not participate, or only participate to a small extent, in the esterification reaction, as for example, aliphatic hydrocarbons, ketones, esters and tertiary alcohols.

The viscosities of the solutions of the starting polymers, measured in 60% solutions at 20° C. on the Gardner-Holdt scale, may lie within the whole range of this scale. Products having Gardner viscosities from A to D should be classified copolymers of low molecular weight, those having viscosities from E to Y copolymers of average molecular weight, and those with viscosities from Y to $Z_2$ copolymers of high molecular weight.

Since the preparation of compent (a) by the reaction between the copolymers, in a solution of aromatics, and the polyols requires at higher temperatures relatively long periods, the content of free hydroxyl groups gives rise possibly as side reactions, to reesterifications between these and the ester groups that are brought into the copolymer, for example, by the use of acrylic acid or methacrylic acid alkylesters, or fumaric acid dialkylesters. Methacrylic acid esters have less tendency to undergo reesterification than acrylic acid and fumaric acid esters. The extent of the reesterification also depends upon the nature of the alcohol that is combined in the monomers in the form of esters. Methanol is split off easier than ethanol, and so on. Ester groups with secondary or tertiary alcohols show only slight or no tendency toward reesterification. These reesterification reactions are of importance in the selection of the copolymer for the reaction with trivalent alcohols. The copolymers having high molecular weights should not contain groups that are inclined to reesterify since this would produce, in the course of the triol reaction, a certain amount of gel formation due to cross-linking, before achieving compatibility with the melamine resins. The reesterifications must, therefore, be confined to limits above which it is not possible to avoid the formation of insoluble or gel-like reaction products due to cross-linking, before achieving compatibility with the melamine resins.

The alkylated aminoplasts that are contained in the mixture of the present invention as component (b) are prepared by alkylation of a condensation product obtained from an aldehyde and urea, N,N'-ethyleneurea, dicyandiamide or aminotriazines, by means of an alkanol containing 1 to 6 carbon atoms. It is possible to use an alkylated aminoplast on condition that it is soluble in the organic solvent used for the preparation of the coating composition. In general, the alkylated aminoplast should contain at least 80%, and preferably 100% methylol groups, which are alkylated with an alkanol having 1 to 6 carbon atoms. It is preferred to use alkylation products that were obtained with alkanols having 3 to 6 carbon atoms. The butylated products are particularly desirable because of their greater compatibility with a large number of polyol reaction products and solvents.

Aminotriazines suitable for the preparation of the aminoplast are: melamine, acetoguanamine, benzoguanamine, formoguanamine, ammeline, 2-chloro-4,6-diamino-1,3,5-triazine, 2-phenyl-p-hydroxy - 4,6 - diamino-1,3,5-triazine, 6-methyl-2,4-diamino-1,3,5-triazine, 2,4,6-trihydrazine-1,3,5-triazine, 2,4,6-triethyl - triamino-1,3,5-triazine or N,N-di-($C_1$–$C_4$)-alkylmelamine, such as N,N-dimethylmelamine. As the aldehyde, although most aldehydes are suitable, such as acetaldehyde, crotonaldehyde and acrolein, it is preferred to use condensation products prepared with reversible polymers of formaldehyde, such as paraformaldehyde.

The component (a), consisting of copolymers reacted with polyols, and the component (b), i.e., the aminoplast, are dissolved in an organic solvent in a ratio of 50 to 95 parts of component (a) to 50 to 5 of component (b), i.e., the aminoplast. The quantitative relations of component (a) and component (b) must be chosen in such a way that the two components are compatible in the coating solution as well as in the finished film. It is possible to use any desired concentration of component (b) and the aminoplast used as component (b) in the solvent, for example, from 1 to 60% by weight. If a pigment is present, the total content of the solids in the coating composition should lie between 5 and 75% by weight. The ratio of pigment to binder, i.e., component (a) plus component (b), can lie between 1:20 and 20:1.

As solvents it is possible to use: hydrocarbons, such as benzene, toluene, xylene and aromatic naphthenes or mixtures of such solvents; esters, such as ethyl, butyl, amyl, ethoxyethyl or methoxyethyl acetate, lactate or propionate; ketones, such as acetone, methylisopropylketone, methylisobutylketone, dioxane, isophoronehexanone or cyclohexanone; alcohols, such as n-butanol, t-butanol, isopropyl alcohol, n-propyl alcohol, amyl alcohol and cyclohexanol; ethers, such as diethylether, the monoethyl, monomethyl and monobutylether of ethylene glycol and various other solvents, such as dimethylformamide, dimethylacetamide, acetonitrile, nitromethane, nitroethane, nitropropane or nitrobutane, as well as mixtures of two or more solvents belonging to the same group as well as of several or all of the groups mentioned above.

As pigments it is possible to incorporate: inorganic pigments and organic dyes that are free of sulphonic or carboxylic acid groups or other groups that impart water-solubility. The expression "pigment" also embraces other water-insoluble organic dyes, as for example, the calcium or barium lacquers of azo lacquer dyes.

The new compositions can be applied to the substrate in any desired fashion, for example, by brushing, spraying, dipping or rolling on. They are then dried and hardened by heating. In general, it is not necessary to add curing catalysts. However, an acid catalyst can be added, if necessary. The amount of such a catalyst may lie between 0.1 and 1% by weight based upon the weight of the aminoplast. The use of a curing catalyst may be appropriate when it becomes necessary to apply low hardening temperatures. When curing catalysts are used, it is possible to achieve insolubility simply by drying and aging at room temperature. The catalyst used for the hardening treatment to set up the compositions according to the present invention, can be any acid catalyst, including all organic and inorganic acid catalysts. For example, it is possible to use a catalytic amount of sulfuric or hydrochloric acid or the salts thereof, as for example, ammonium sulfate or ammonium chloride, or an organic acid, such as acetic acid, phthalic acid, benzoic acid, toluenesulfonic acid, naphthalenesulfonic acid or the monosalt of maleic acid with triethylamine.

The drying of the coatings can be effected at raised temperatures, for example, 60 to 104° C. The hardening can be carried out at 80 to 230° C., whether or not a catalyst is present. The hardening period may lie in the upper temperature range of about 230° C. between ½ and 2 minutes and in the lower temperature range of about 80° C. between 1 and 2 hours. However, it is particularly advantageous to effect the hardening for 15 to 30 minutes at 120 to 130° C.

EXAMPLE 1

(A) Preparation of component (a) contained in the coating composition.—560 parts by weight of 1-dodecene and 944 parts by weight of xylene are heated in a three-neceked flash equipped with a stirrer, thermometer and reflux cooler, and heated to 130 to 140° C. A mixture consisting of 16 parts by weight of benzoyl peroxide, 700 parts by weight of methylmethacrylate, and 106 parts by weight of maleic acid anhydride is then added within a period of 2 hours and polymerized for an additional 2 hours. The body content of the solution amounts to 42%. Upon adding another 16 grams of benzoyl peroxide within 6 hours, and continuing the polymerization at 130° to 140° C., it is possible to arrive at a body content of 50% and a viscosity of C to D on the Gardner-Holdt scale. The resin solution is clear at room temperature.

1000 parts by weight of the 50% resin solution are mixed with 62 parts by weight of trimethylolpropane and heated under reflux at about 168 to 172° C. After a reaction period of 1 hour, the reaction product was found to be compatible with melamine-formaldehyde resins after being baked. The viscosity of the 52% solution was approximately T to U on the Gardner-Holdt scale, whereas the acid number was 44 and the hydroxyl number about 50.

(B) Preparation of the heat-hardenable binder totaling up to 70% by weight of component (a) to 30% by weight of component (b) melamine resin.—700 parts by weight of component (a) prepared according to Example 1A were mixed at room temperature with 300 parts by weight of a 50% solution of an isobutanol-etherified melamineformaldehyde resin prepared in accordance with the process of German Pat. 1,127,083.

The melamine resin was prepared by the process described in Example 1 of German Pat. 1,127,083 in such a way that, after the separation of water, it had a viscosity of A-B on the Gardner-Holdt scale, the excess isobutonol being then distilled off and replaced with xylene. The solution had a solids content of 50 to 52% by weight and a viscosity of 50 to 70 DIN-seconds at 20° C.

This mixture and 340 grams of $TiO_2$ (rultile) was made into a lacquer by grinding, which lacquer was diluted with butylacetate to a spraying viscosity of 20 DIN-seconds. It was applied to phosphated sheet metal and baked for 30 minutes at 130° C. The film had an excellent gloss, great flexibility, and good surface hardness as well as a good resistance to chemicals.

EXAMPLE 2

(A) Preparation of component (a) contained in the heat-hardenable binder.—In the same way as explained in Example 1A, 560 parts by weight of 1-dodecene and 944 parts by weight of xylene are heated to 130 to 140° C., whereupon a mixture consisting of 16 parts by weight of benzoyl peroxide, 106 parts by weight of maleic acid anhydride and 730 parts by weight of butylacrylate is added within a period of 8 hours and polymerized for an additional 2 hours. The body content of the solution amounts to 48% by weight. Upon adding another 5 grams of benzoyl peroxide and continuing the polymerization at 130 to 140° C., it is possible to arrive at a body content of 52% and a viscosity of less than A on the Gardner-Holdt scale. The resin solution is clear at room temperature.

1000 parts by weight of the 52% resin solution are mixed with 62 parts by weight of trimethylol-propane and are heated under reflux to about 168 to 172° C. After a reaction period of 8 hours, the reaction product, i.e., component (a), was found to be compatible with melamine-formaldehyde resins, i.e., component (b) after being baked. The viscosity of the 50% solution was approximately that of D on the Gardner-Holdt scale, whereas the acid number was 40 and the hydroxyl number about 60.

(B) Preparation of the heat-hardenable binder totaling up to 70% by weight of component (a) to 30% by weight of component (b) melamine resin.—700 grams of the 50% solution of component (a) prepared according to Example 2A are mixed at room temperature with 340 parts by weight of $TiO_2$ (rutile) and 300 parts of a 50% solution of an isobutanol-esterified melamine-formaldehyde resin as component (b), prepared in the manner described in Example 1B, are made into a lacquer by grinding which is then diluted with butylacetate to spraying viscosity of 20 DIN-seconds. It is applied to phosphated sheet metal and baked thereon for 30 minutes at 120° C. The films obtained in this manner had excellent flexibility.

EXAMPLE 3

(A) Preparation of component (a) contained in the heat-hardenable binder.—In the same way as explained in Example 1A, 560 parts by weight of 1-dodecene and 944 parts by weight of xylene are heated to 130 and 140° C., whereupon a mixture consisting of 16 parts by weight of benzoyl peroxide, 106 parts by weight of maleic acid anhydride and 730 parts by weight of dibutylfumarate is added within the period of 8 hours and polymerized for another 2 hours. The body content of the solution amounts to 37% by weight. Upon adding another 20 grams of benzoyl peroxide within 6 hours and continuing the polymerization at 130 to 140° C., it is possible to arrive at a body content of 50% by weight and a viscosity of less than A on the Gardner-Holdt scale. The resin solution is clear at room temperature.

1000 parts by weight of the 50% resin solution are mixed with 62 parts by weight of trimethylol-propane and are heated under reflux to about 168 to 172° C. After a reaction period of 8 hours, the reaction product was found to be compatible with melamine-formaldehyde resins after being baked. The viscosity of the 51% solution was approximately that of B on the Gardner-Holdt scale, whereas the acid number was 42 and the hydroxyl number about 70.

(B) Preparation of the heat-hardenable binder totaling up to 60% by weight of component (a) to 40% by weight of component (b) melamine resin.—600 parts by weight of component (a) prepared according to Example 3A, are mixed with 400 parts by weight of the melamine resin used in Example 1 in the form of a 50% solution as described in Example 1B, applied to deep-drawn sheet metals and baked thereon for 30 minutes at 130° C. The resulting film had good surface hardness and excellent flexibility.

According to one embodiment of the present invention the binder contains a reaction product of a copolymer and polyols, wherein said copolymer contains up to 23% by weight, preferably 6 to 12% by weight of copolymerized itaconic acid anhydride.

According to a preferred embodiment of the present invention, the binder contains as component (a) a reaction product of trivalent alcohols, applied singly or in the form of mixtures, and copolymers wherein per mole of anhydride group in the copolymer there are present, condensed therewith, 0.8 to 1.8 moles, preferably 0.8 to 1.2 moles of triol.

According to a further preferred embodiment of the present invention the binder contains as component (a) reaction products of polyols and copolymers obtained from 5 to 10% by weight of maleic acid anhydride, 10 to 50% by weight of mono-olefines of the formula H$_2$C=CHR, wherein R represents a hydrogen atom or a straight-chain or branched alkyl radical having 1 to 20 carbon atoms, 40 to 85% by weight of acrylic acid ester and/or fumaric acid ester wherein the alkyl radicals contain 1 to 10 carbon atoms and 0 to 30% by weight of methylmethacrylate.

In accordance with another preferred embodiment of the present invention, there are preferred as component (a) those reaction products of polyols and copolymers obtained from 5 to 10% by weight of maleic acid anhydride and 10 to 50% by weight of mono-olefines copolymerized therewith, that contain as copolymerized α-mono-olefine the following compounds: 1-butene, 1-pentene, 1-hexene, 1-heptene, 1-octene, 1-nonene, 1-decene, 1-undecene and 1-dodecene, and of those that contain 40 to 85% by weight of acrylic acid and/or fumaric acid esters, wherein the alkyl radicals have 1 to 10 carbon atoms, the following alkyl radicals are preferred: methyl, ethyl, propyl, butyl, hexyl, octyl, 2-ethylhexyl and decyl.

When itaconic acid is used in place of maleic acid anhydride, the copolymer may contain up to 25% and preferably not more than 23% by weight of the itaconic acid anhydride, and the use of a proportion of 6–12% by weight of itaconic acid anhydride has been found to produce most favorable results.

Where less than 5–16% by weight of the maleic or itaconic acid anhydride are used, less satisfactory results are obtained than are obtained when the preferred range is employed, and in any event a small but effective percentage of the anhydride, preferably at least 1% by weight, should be employed.

What is claimed is:

1. A binder suitable for forming heat hardenable coating compositions soluble in organic solvents comprising a blend of (A) about 50% to 95% by weight of a soluble reaction product prepared by reacting (1) a copolymer prepared by heating (a) about 1%–25% of alpha, beta unsaturated dicarboxylic acid anhydride and (b) about 99–75% of at least one monomer selected from the group consisting of mono-olefins with terminal double bonds, that are not branched at said double bonds, and (c) at least one monomer selected from the group consisting of alkylacrylates, alkylmethacrylates and dialkylfumarates, wherein the alkyl radical contains from 1–10 carbon atoms, and mixtures thereof, with (2) a trihydric alcohol until an acid number of about 5–60 and a hydroxyl number of about 20–120 is obtained and (B) about 50%–5% by weight of an etherified aminoplast selected from a group consisting of a urea-formaldehyde and an aminotriazine formaldehyde resin.

2. A binder according to claim 1, wherein (2) also contains a member of a group from monohydric and dihydric alcohols.

3. A binder according to claim 1 wherein (a) is from about 5–10% by weight of maleic acid anhydride.

4. A binder according to claim 1, wherein (a) is from about 6–12% by weight itaconic acid anhydride.

5. A binder according to claim 1, wherein per mole anhydride group from about 0.8–1.2 moles of trihydric alcohol are used.

6. A binder according to claim 1, wherein (2) is selected from the group of trimethylolpropane, trimethylolethane, hexane-triol-1,2,6 and mixtures thereof.

7. A binder according to claim 1, wherein (a) is from about 5–10% by weight of maleic acid anhydride and (b) is about 10–50% of a monomer of the group consisting of mono-olefins having the formula H$_2$C=CHR wherein R represents a hydrogen and an alkyl radical having 1–20 carbon atoms, and (c) is about 40–85% by weight of an alkyl ester of the group consisting of acrylic acid and fumaric acid, wherein the alkyl groups contain 1 to 10 carbon atoms and 0–30% by weight of methylmethacrylate.

8. A binder according to claim 1, wherein (B) is a condensation product of formaldehyde with a member of the group of urea, N,N'-ethyleneurea and aminotriazine, said member being etherified with an alkanol having from 1–6 carbon atoms.

9. A binder according to claim 1, wherein (B) is an aminoplast having at least 80% methylol groups.

10. A binder according to claim 1, wherein (B) is a butylated aminoplast.

References Cited

UNITED STATES PATENTS

| | | |
|---|---|---|
| 2,418,688 | 4/1947 | Atwood. |
| 2,725,308 | 11/1955 | Nickerson _____ 260—851 |
| 2,912,413 | 11/1959 | Baer. |
| 3,085,986 | 4/1963 | Muskat. |
| 3,118,848 | 1/1964 | Lombardi et al. _____ 260—851 |
| 3,196,120 | 7/1965 | McLaughlin et al. ____ 260—855 |
| 3,267,174 | 8/1966 | Fry et al. _____ 260—851 |
| 3,352,806 | 11/1967 | Hicks _____ 260—851 |

JOHN C. BLEUTGE, Primary Examiner

U.S. Cl. X.R.

117—132, 161; 260—31.2, 31.4, 32.4, 32.6, 32.8, 33.2, 33.4, 33.6, 39, 41, 75, 78.5, 850, 851, 856